(12) United States Patent
Xu et al.

(10) Patent No.: US 11,605,402 B2
(45) Date of Patent: *Mar. 14, 2023

(54) VIDEO-LOG PRODUCTION SYSTEM

(71) Applicant: AT&T Intellectual Property I, L.P., Atlanta, GA (US)

(72) Inventors: Tan Xu, Bridgewater, NJ (US); Behzad Shahraray, Holmdel, NJ (US); Eric Zavesky, Austin, TX (US); Lee Begeja, Gillette, NJ (US); Paul Triantafyllou, Summit, NJ (US); Zhu Liu, Marlboro, NJ (US); Bernard S. Renger, New Providence, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 87 days.

This patent is subject to a terminal disclaimer.

(21) Appl. No.: 17/107,907

(22) Filed: Nov. 30, 2020

(65) Prior Publication Data

US 2021/0082472 A1 Mar. 18, 2021

Related U.S. Application Data

(63) Continuation of application No. 16/134,683, filed on Sep. 18, 2018, now Pat. No. 10,885,942.

(51) Int. Cl.
| | | |
|---|---|---|
| *H04N 5/93* | (2006.01) | |
| *G11B 27/00* | (2006.01) | |
| *G11B 27/036* | (2006.01) | |
| *H04N 21/24* | (2011.01) | |
| *H04N 21/472* | (2011.01) | |
| *H04N 9/80* | (2006.01) | |

(52) U.S. Cl.
CPC ....... *G11B 27/036* (2013.01); *H04N 21/2407* (2013.01); *H04N 21/47205* (2013.01)

(58) Field of Classification Search
USPC ................................................. 386/248, 278
See application file for complete search history.

(56) References Cited

U.S. PATENT DOCUMENTS

| | | | |
|---|---|---|---|
| 7,194,757 B1* | 3/2007 | Fish | ................... H04N 7/17309 |
| | | | 725/86 |
| 8,150,464 B2 | 4/2012 | Dey | |
| 8,464,304 B2 | 6/2013 | Harwell et al. | |
| 8,972,402 B1 | 3/2015 | Gupte et al. | |
| 9,116,989 B1* | 8/2015 | Ehlen | .................. G06F 3/04842 |
| 9,178,961 B2 | 11/2015 | Dey | |
| 9,201,571 B2 | 12/2015 | Lapierre et al. | |
| 9,348,909 B1 | 5/2016 | Goikhman et al. | |
| 9,584,865 B2 | 2/2017 | Dey | |

(Continued)

*Primary Examiner* — Nigar Chowdhury (57) ABSTRACT

Methods, computer-readable media, and apparatuses for composing a video in accordance with a user goal and an audience preference are described. For example, a processing system having at least one processor may obtain a plurality of video clips of a user, determine at least one goal of the user for a production of a video from the plurality of video clips, determine at least one audience preference of an audience, and compose the video comprising at least one video clip of the plurality of video clips of the user in accordance with the at least one goal of the user and the at least one audience preference. The processing system may then upload the video to a network-based publishing platform.

20 Claims, 4 Drawing Sheets

(56) References Cited

U.S. PATENT DOCUMENTS

| | | | |
|---|---|---|---|
| 9,626,798 B2* | 4/2017 | Zavesky | H04N 21/4394 |
| 9,953,073 B2 | 4/2018 | Hein et al. | |
| 10,063,927 B1 | 8/2018 | Singh et al. | |
| 10,424,102 B2 | 9/2019 | McKaskle et al. | |
| 2002/0097259 A1 | 7/2002 | Marshall et al. | |
| 2005/0141859 A1* | 6/2005 | Cheatle | G11B 27/031 |
| | | | 386/278 |
| 2006/0277457 A1 | 12/2006 | Salkind et al. | |
| 2007/0203911 A1 | 8/2007 | Chiu | |
| 2008/0037826 A1 | 2/2008 | Sundstrom et al. | |
| 2008/0189604 A1 | 8/2008 | Washburn et al. | |
| 2008/0306995 A1 | 12/2008 | Newell et al. | |
| 2009/0132349 A1 | 5/2009 | Berkley et al. | |
| 2009/0319516 A1 | 12/2009 | Igelman et al. | |
| 2011/0194839 A1 | 8/2011 | Gerbert et al. | |
| 2012/0158527 A1 | 6/2012 | Cannelongo et al. | |
| 2012/0189282 A1 | 7/2012 | Wyatt et al. | |
| 2013/0124984 A1 | 5/2013 | Kuspa | |
| 2013/0266290 A1 | 10/2013 | Sathish | |
| 2014/0099081 A1 | 4/2014 | Cudak et al. | |
| 2014/0161354 A1 | 6/2014 | Curcio et al. | |
| 2014/0208235 A1 | 7/2014 | Robinson et al. | |
| 2014/0229991 A1 | 8/2014 | Phillips et al. | |
| 2015/0117839 A1 | 4/2015 | Oberbrunner et al. | |
| 2015/0213147 A1 | 7/2015 | Riggs et al. | |
| 2015/0287093 A1 | 10/2015 | Steele | |
| 2016/0014482 A1 | 1/2016 | Chen et al. | |
| 2016/0261929 A1 | 9/2016 | Lee et al. | |
| 2016/0286244 A1 | 9/2016 | Chang et al. | |
| 2016/0292288 A1 | 10/2016 | Walton et al. | |
| 2017/0032823 A1 | 2/2017 | Rav-Acha et al. | |
| 2017/0055014 A1 | 2/2017 | Bou Balust et al. | |
| 2017/0127127 A1* | 5/2017 | Zavesky | G06V 20/46 |
| 2017/0303001 A1 | 10/2017 | Montoya et al. | |
| 2017/0324996 A1 | 11/2017 | Thaker et al. | |
| 2018/0020243 A1 | 1/2018 | Ni et al. | |
| 2018/0196812 A1 | 7/2018 | Gupta et al. | |
| 2019/0200079 A1 | 6/2019 | Mathur et al. | |

\* cited by examiner

VIDEO-LOG PRODUCTION SYSTEM

This application is a continuation of U.S. patent application Ser. No. 16/134,683, filed Sep. 18, 2018, which is herein incorporated by reference in its entirety.

The present disclosure relates generally to video logs, and more particularly to methods, computer-readable media, and devices for composing a video in accordance with a user goal and an audience preference.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure describes a method, computer-readable medium, and apparatus for composing a video in accordance with a user goal and an audience preference. For example, a processing system having at least one processor may obtain a plurality of video clips of a user, determine at least one goal of the user for a production of a video from the plurality of video clips, determine at least one audience preference of an audience, and compose the video comprising at least one video clip of the plurality of video clips of the user in accordance with the at least one goal of the user and the at least one audience preference. The processing system may then upload the video to a network-based publishing platform.

Video logging, or video blogging, is a trending way of online self-broadcasting, and drives increasing video consumption, Internet traffic, and other network-based social activities. However, the content producer (v-logger) often applies a great amount of effort to create, post-produce (e.g., video edit, add effects and color correction, soundtrack editing, etc.), and publish/distribute. The present disclosure provides a processing system that drives video (e.g., v-log) production in accordance with user goals and audience preferences.

For example, video clips may be shot by a v-logger and input to the processing system. Then, the processing system may provide post-production operations, such as goal-oriented video editing. For instance, a user may set up one or more publishing goals (e.g., maximizing viewership, maximizing viewership of a target audience, maximizing advertisement insertion, maximizing revenue from advertising, maximizing revenue from subscriptions, and so on) and the processing system will manipulate and arrange video shots into a video in accordance with the one or more user goals. The processing system may also implement viewer preference-based editing. For example, the processing system may analyze similar v-logs or v-loggers' audience/viewership information, and use such information to arrange video segments into a video, and/or to edit the video (and/or the video segments from which the video is composed) using one or more editing techniques. For instance, certain audiences may have preferences for certain editing techniques and/or for certain video styles which may be achieved using such editing techniques.

In one example, the processing system may also personalize the arrangement of video clips into a video and/or tailor the editing of the video/video segments using editing preferences derived from the v-logger's past editing behaviors, inferred from indications of the user of other videos' style(s) that the user wants to emulate, or manually indicated by the user to the processing system. In one example, the processing system may produce several versions of a video with different editing techniques according to one or more delivery requirements of a target platform, such as a maximum or minimum duration, a video encoding technique, and so forth.

In one example, users may utilize wearable cameras to record daily activities and upload video clips to the processing system for storage, analysis, and personalized profiling. For example, the processing system may generate additional metadata for each video clip for organization and management in addition to any metadata provided with the video clip as received from the creator. In one example, the processing system may automatically generate daily, weekly, or monthly video summaries, video highlights, topically organized videos, and so on. In one example, a user can also designate particular subjects as the focus of a v-log, and the processing system may curate the topically relevant video clips from the user's library of video clips that are received and stored by the processing system. In addition, the user may be provided options to directly publish a particular auto-generated video to one or more publishing platforms.

An example of the present disclosure may operate as follows. First, new video clips may be input to the processing system by a user. In one example, the video clips may be in a raw format without editing. The processing system may then pre-process the video clips for determining themes/topics, the presence of recognized objects and/or people, and so on. This stage may include the application of one or more theme/topic detection models, object detection models, or the like to detect various features which may be then stored as metadata along with the respective video clips. The video clips may include content recorded from an outward facing camera of a handheld device, a wearable device, etc., a camera directed at the user's face, a surveillance camera, a dash-cam, a 360 degree camera, and so on.

The processing system may then organize the video clips into one or more automatically generated videos. The processing system may do so periodically or on demand at the instruction of the user. In particular, the processing system may generate a video in accordance with one or more user goals, such as: a target video length, maximizing a number of advertising slots or achieving a target number of advertising slots, maximizing repeat viewership, maximizing a viewership count overall or among a particular demographic group, interest group, or community, focusing upon a particular subject/topic, maximizing online social sharing and/or discussion, and so on. In one example, user goals may not be explicit, but may be determined from records of other videos/other users, and/or from a standard profile for a content type (e.g., a do-it-yourself video category versus a lifestyle or pop-culture video category). Accordingly, in one example, the processing system may retrieve similar videos (e.g., v-logs) as source materials and training materials for machine-learning recommendations.

The processing system may also account for viewership preferences of a target audience specified by the user, a target audience represented by the most recent viewers of videos of the user, e.g., the last 1000 viewers, the last 10,000 viewers, the viewers of the past day, the viewers of the past week, and so on, a target audience represented by the audiences of one or more other users (v-loggers) that are similar to the user or for whom the user has indicated an affinity. The audience/viewership preferences can include techniques for arrangement of shots, a theme, topic, and/or type of content which may influence video clip selection, editing techniques for content, lighting, color, and mood enhancements, which may also be further refined according to style and genre, such as an overlay of other assets (e.g., audio, text, other videos, etc.), application of cuts, fades, pans, zooms, close-ups, panoramas, and so on. In one example, the processing system may arrange and edit video clips according to the user goal(s), and in accordance with audience preferences that are not in conflict with the user goal(s).

The processing system may also account for user preferences for editing techniques which may be manually indicated by the user, determined from past usage of editing techniques by the user, determined from an indication by the user of a preference for videos similar to one or more videos from one or more other users (v-loggers), and so on. For example, the processing system may first consider editing techniques that are determined to be audience preferences that are the same as those indicated by the user preferences. Similarly, the processing system may also account for delivery specifications of one or more target platforms (e.g., for resolution, video length, and so on).

In one example, the processing system may include in an automatically generated video links to similar videos from other users relating to a same event which are topically similar. In one example, the inclusion of links may be a default behavior. In another example, the inclusion of links may be in accordance with a user goal or preference and/or an audience preference. In one example, the arrangement of a video may include determining where advertisements can be inserted and what advertisements to insert in accordance with the user goals and/or audience preferences. For instance, the theme/topic of a video clip (and/or of the overall video) may dictate the type of advertisement that may be inserted. In one example, the processing system annotates the video (e.g., in a manifest file, in metadata stored with the video clips, etc.), with advertisement placeholder keywords which can be deduced from the video content itself, from user goals, from peer video source materials, and so forth.

In one example, the processing system may collect viewership information in connection with historical editing behavior, and determine the impact on viewership volume, viewing durations, viewer types/demographics, viewer feedback, and so on after edits are made. In one example, the processing system may provide automated A/B testing (also known as bucket tests or split-run testing) of creating an edit, viewing its impact and response on a submarket of viewers, and continuing the design process from one or more user goals. In one example, video composition and editing may be adjusted according to real-time viewership metrics, such as comments, viewership, preferences, watch time, volume of social sharing, and so on.

In addition, in one example, the processing system may provide an interactive user dialog for mediation, creation, and revisions as the user is given feedback for created work product. In addition, the processing system may provide suggestions to the user for certain topics/themes, the use of certain camera angles, filters, lighting, the inclusion of certain other people, animals, or objects, and so on. In one example, the processing system may allow a user to provide input (e.g., a verbal/audio input) to identify to the processing system "interesting" video clips that should be considered for inclusion in a video (e.g., a v-log). For instance, the input can be specific predetermined keywords or a command. Alternatively, or in addition the processing system may determine a video clip is "interesting" based upon detection models for detecting excitement, e.g., voice tone, pitch, change in tone or pitch, etc. (e.g., "Look at this!," "This looks great!," or "Awesome!"), a high degree of movement compared to little to no movement, a change in scene or objects in view, and so on. In one example, "interesting" video clips may also be identified from other sensors, or in combination with visual or audio information from the video clips, such as wearable sensor devices or environmental sensors detecting movement, increased heart rate, rapid eye movement, and so on.

Examples of the present disclosure therefore provide automated video generation and video editing in accordance with user goals and viewership preferences, providing streamlined post-production to speed up the creation and delivery of videos/v-logs to publishing platforms and viewers/audiences. These and other aspects of the present disclosure are described in greater detail below in connection with the examples of FIGS. 1-4.

Figure 1:
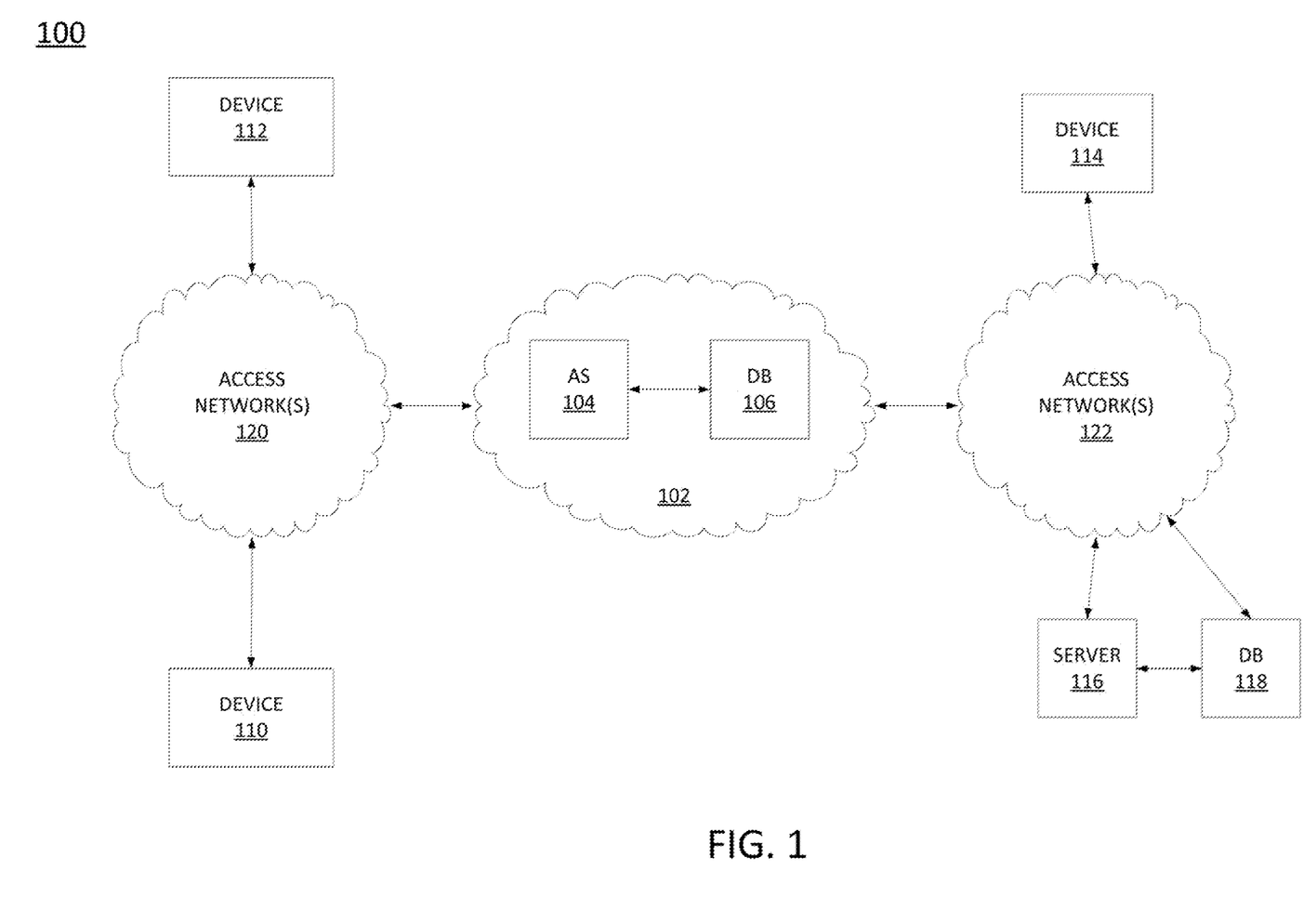
FIG. 1 illustrates an example network related to the present disclosure.

To further aid in understanding the present disclosure, FIG. 1 illustrates an example system 100 in which examples of the present disclosure for composing a video in accordance with a user goal and an audience preference may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, 4G, 5G and the like), a long term evolution (LTE) network, and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a core network 102. The core network 102 may be in communication with one or more access networks 120 and 122, and the Internet (not shown). In one example, core network 102 may combine core network components of a cellular network with components of a triple play service network; where triple-play services include telephone services, Internet services and television services to subscribers. For example, core network 102 may functionally comprise a fixed mobile convergence (FMC) network, e.g., an IP Multimedia Subsystem (IMS) network. In addition, core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 102 may further comprise a broadcast television network, e.g., a traditional cable provider network or an Internet Protocol Television (IPTV) network, as well as an Internet Service Provider (ISP) network. In one example, core network 102 may include a plurality of television (TV) servers (e.g., a broadcast server, a cable head-end), a plurality of content servers, an advertising server (AS), an interactive TV/video on demand (VoD) server, and so forth. For ease of illustration, various additional elements of core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, $3^{rd}$ party networks, and the like. For example, the operator of core network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one embodiment, the core network 102 may be operated by a telecommunication network service provider. The core network 102 and the access networks 120 and 122 may be operated by different service providers, the same service provider or a combination thereof, or may be operated by entities having core businesses that are not related to telecommunications services, e.g., corporate, governmental or educational institution LANs, and the like.

In one example, the access networks 120 may be in communication with one or more devices 110 and 112. Similarly, access networks 122 may be in communication with one or more devices, e.g., device 114. Access networks 120 and 122 may transmit and receive communications between devices 110, 112, and 114, between devices 110, 112, and 114, and server 116 and/or database (DB) 118, application server (AS) 104 and/or database (DB) 106, other components of core network 102, devices reachable via the Internet in general, and so forth. In one example, each of the devices 110, 112, and 114 may comprise any single device or combination of devices that may comprise a user endpoint device. For example, the devices 110, 112, and 114 may each comprise a mobile device, a cellular smart phone, a laptop, a tablet computer, a desktop computer, an application server, a bank or cluster of such devices, and the like. In one example, devices 110, 112, and 114 may each comprise programs, logic or instructions for performing functions in connection with examples of the present disclosure for composing a video in accordance with a user goal and an audience preference. For example, devices 110, 112, and 114 may each comprise a computing system or device, such as computing system 400 depicted in FIG. 4, and may be configured to provide one or more operations or functions in connection with examples of the present disclosure for composing a video in accordance with a user goal and an audience preference, as described herein.

Figure 4:
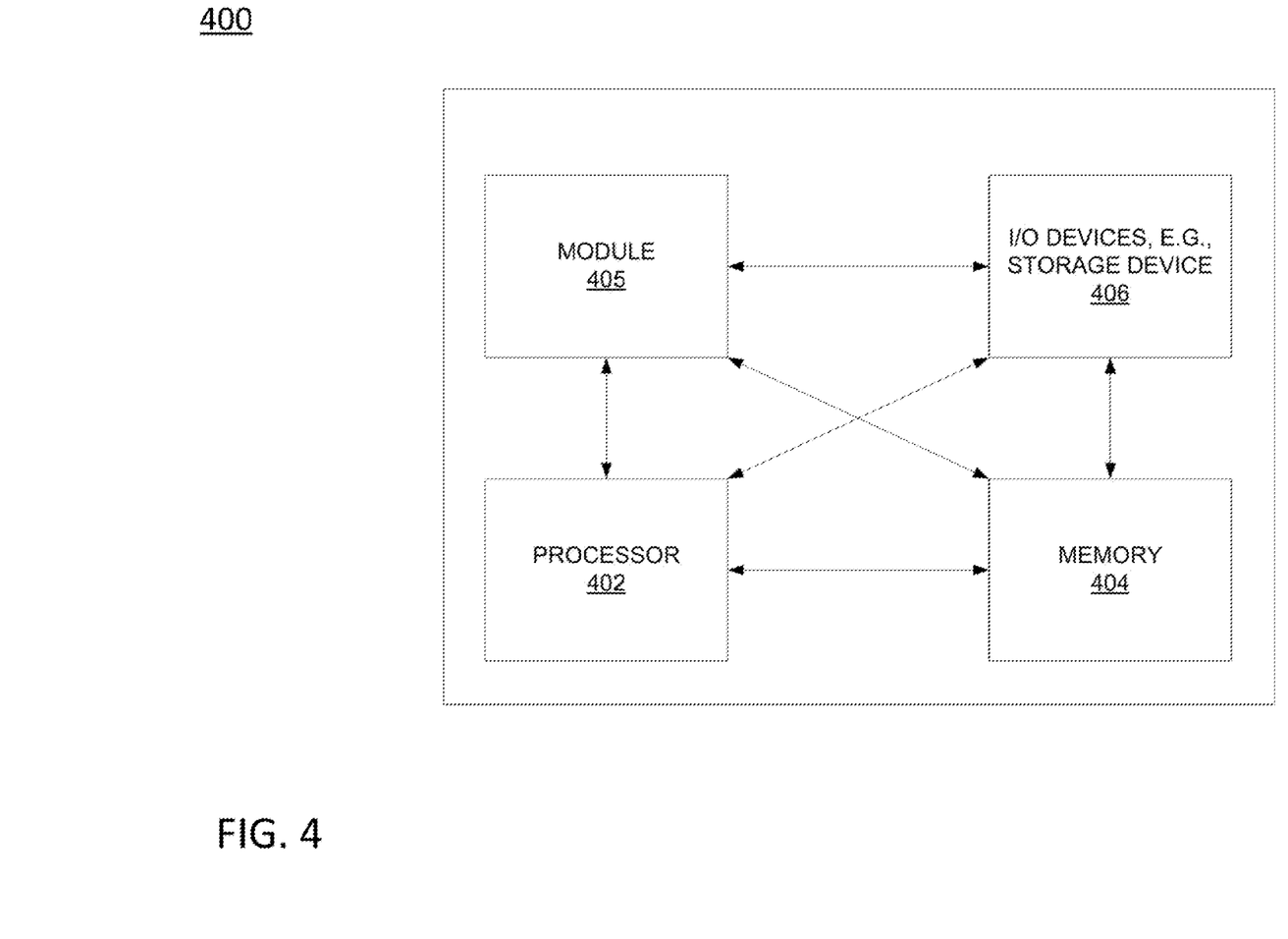
FIG. 4 illustrates a high level block diagram of a computing device specifically programmed to perform the steps, functions, blocks and/or operations described herein.

In one example, the access networks 122 may also be in communication with a server 116 and a database (DB) 118. The server 116 and DB 118 may comprise or be associated with, for example, a video hosting and distribution platform (e.g., a v-log publishing platform). In accordance with the present disclosure, server 116 may comprise a computing system or server, such as computing system 400 depicted in FIG. 4, and may be configured to provide one or more operations or functions for composing a video in accordance with a user goal and an audience preference, as described herein. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

In one example, DB 118 may comprise a physical storage device integrated with server 116 (e.g., a database server), or attached or coupled to the server 116, to store various types of information in support of systems for composing a video in accordance with a user goal and an audience preference, in accordance with the present disclosure. For example, DB 118 may store video segments of various users (e.g., v-loggers), metadata of the video segments (e.g., information regarding topics identified in the respective video segments, the character(s) present, video segment durations, video quality information, video format information, authorship information, ownership and/or licensing information, date recorded, date uploaded, and segment viewership information, such as a number of views, a duration of viewing, or segment ratings), audience preferences, e.g., for various audience demographics, and so forth that may be processed by server 116. In one example, DB 118 may also store assembled videos, or plans for assembling videos from video clips (e.g., manifest files), which may be provided to devices requesting and/or obtaining videos via server 116. DB 118 may also store programs, logic, or instructions that may be executed by server 116 for composing a video in accordance with a user goal and an audience preference as described herein.

To illustrate, server 116 may obtain a plurality of video clips of a user, determine at least one goal of the user for a production of a video from the plurality of video clips, determine at least one audience preference of an audience, compose the video comprising at least one of the plurality of video clips of the user in accordance with the at least one goal of the user and the at least one audience preference, upload the video to a network-based publishing platform, and so forth. In one example, server 116 may obtain the video clips and related information, such as identified topics, viewership information, and so on from DB 118. In one example, the video clips may be received by DB 118 from one or more devices of one or more users (v-loggers) who have created various video clips, such as device 114.

In one example, server 116 may receive a request for a video from a viewer device comprising one of the device 110 or device 112, and the video, or instructions for retrieving the video, or video segments of the video may be provided to such a viewer device. The request may be received via access networks 120, access networks 122, core network 102, and/or Internet in general, and the video, or instructions for retrieving the video, or video segments of the video, may be provided via any one or more of the same networks. For example, the video may be downloaded to the viewer device in its entirety, or may be streamed via the one or more networks. In one example, viewer devices do not necessarily request specific videos, but the server 116 may select one or more videos for presentation to various viewers via respective viewer devices. For instance, if a viewer device has finished or has almost finished presenting a first video, the server 116 may select and queue a next video for the viewer device, such as another video by the same user (v-logger), another video in a same subject area, a recommended video (e.g., recommended among the users of the platform, or a sub-group of users of the platform, etc.), and so on. The server 116 may stream the videos to these viewer devices or may direct the viewer devices to one or more network locations (e.g., using manifest files for the videos, or the like). These and other aspects of the present disclosure are discussed in greater detail below in connection with the examples of FIGS. 2 and 3.

Although only a single server 116 and a single DB 118 are illustrated, it should be noted that any number of servers 116 or databases 118 may be deployed. In one example, core network 102 may also include an application server (AS) 104 and a database (DB) 106. In one example, AS 104 may perform the same or similar functions as server 116. Similarly, DB 106 may store the same or similar information as DB 118 (e.g., video segments, metadata of videos or video segments, audience information, etc., programs, logic, or instructions that may be executed by AS 104 and/or server 116 for composing a video in accordance with a user goal and an audience preference, and so forth). For instance, core network 102 may provide a video hosting and distribution service (e.g., a v-log service) to subscribers, e.g., in addition to television, phone, and/or other telecommunication services. In one example, AS 104, DB 106, server 116, and/or DB 118 may operate in a distributed and/or coordinated manner to perform various steps, functions, and/or operations described herein.

It should be noted that the system 100 has been simplified. Thus, the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of core network 102 and/or access networks 120 and 122 may comprise a content distribution network (CDN) having ingest servers, edge servers, and the like, for packet-based streaming of videos or video segments that may be provided in accordance with the present disclosure. Similarly, although only two access networks 120 and 122 are shown, in other examples, access networks 120 and/or 122 may each comprise a plurality of different access networks that may interface with core network 102 independently or in a chained manner. For example, device 114 and server 116 may access core network 102 via different access networks, devices 110 and 112 may access core network 102 via different access networks, and so forth. Thus, these and other modifications are all contemplated within the scope of the present disclosure.

Figure 2:
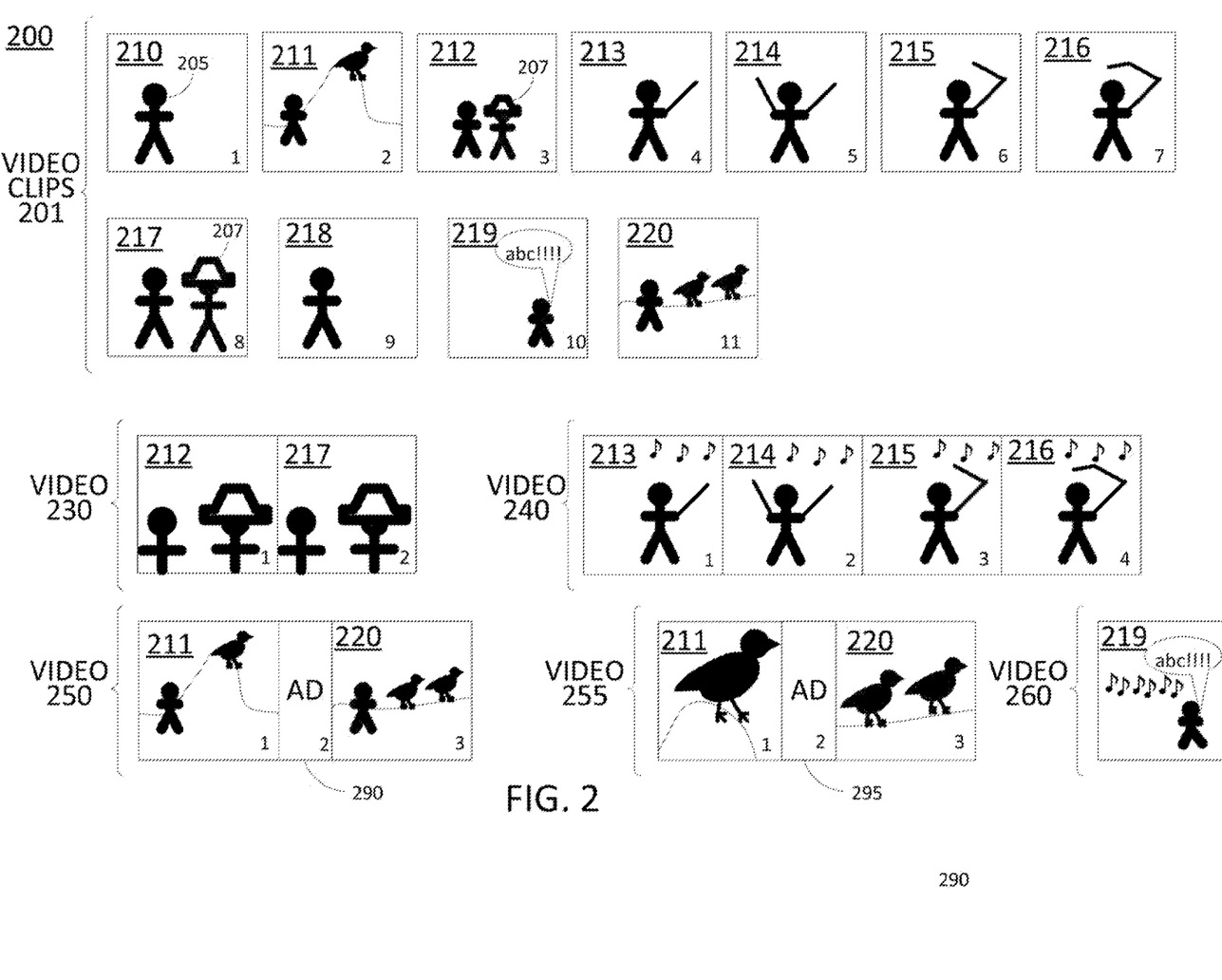
FIG. 2 illustrates an example process in accordance with the present disclosure.

FIG. 2 illustrates an example process 200 in accordance with examples of the present disclosure for composing a video in accordance with a user goal and an audience preference. As illustrated in FIG. 2, the process 200 may begin with a library of video clips 201 of a user 205 (including video clips 210-220, each illustrated as a tile with a representative frame/shot of the respective video clip). The temporal sequence of the video clips 201 is indicated by the number in the lower right corner of each tile. For instance, video clip 210 was recorded at a time prior to video clip 211, and so on. However, it should be understood that the video clip 211 does not necessarily begin at the exact time that video clip 210 ends. For example, the user 205 may have turned off a camera via which the video clips 201 are recorded and then turned the camera back on at a later time. The video clips 201 may be gathered and stored by a processing system, which may comprise and/or include one or more computing devices of the user, one or more network-based computing devices, or a combination thereof.

In one example, the processing system may segment recordings into video clips. For example, shot and scene detection algorithms may locate and tag shot and/or scene boundaries in recorded video content. For instance, a shot detection program may utilize color histogram differences or a change in color distribution, edge change ratios, standard deviation of pixel intensities, contrast, average brightness, and the like to identify hard cuts, fades, dissolves, etc., which may indicate the end of a shot and the beginning of another shot. In addition, shot and scene detection programs implemented in examples of the present disclosure may also detect shot and scene boundaries utilizing any topics that are identified as defining features of the respective shots and/or scenes. It should be noted that in some cases, a scene may be comprised of a single shot or a plurality of shots. In one example, a shot is broadly interpreted as a sequence of one or more frames of images shot by a camera. In one example, multiple techniques may be used in aggregate to delineate content segments within a content source.

In one example, the processing system may perform various front-end operations in connection with storing the library of video clips 201. For instance, the processing system may apply speech-to-text conversion and word/phrase extraction of the converted text, image feature extraction, audio feature extraction, which may be used to distinguish a bird call, a train whistle, a crashing wave, a type of music or a particular composition, and so forth. In still another example, the processing system may apply optical character recognition (OCR) image processing to extract text from the video clips 210-220 and then perform word/phrase extraction from the detected text. In one example, the front-end operations may be performed prior to identifying the video clips 210-220, e.g., prior to segmenting recorded video. In one example, the processing system may also perform topic/theme detection from the extracted words/phrases, extracted image features and/or extracted audio features, OCR-recognized text, and so on.

In one example, a topic may comprise a "concept" from a lexical database. For example, the Large Scale Theme Ontology for Multimedia (LSCOM) has hundreds of "themes," such as: "parade," "exiting car," "handshaking," "running," "rocket launching," "barn," "college," "castle," "conference room," "emergency room," "bathroom," "interview on location," "text on artificial background," "ship," "shipyard," "birds," "face," "bicycle," and so on. Other examples include LSCOM-Lite, which has 39 themes, National Institute of Standards and Technology (NIST) Text REtrieval Conference (TREC) Video Retrieval Evaluation (TRECVID) lexical themes, and the like. In one example, the present disclosure may utilize a lexicon that is specific to one or more themes, topics, subjects, interest areas, etc., designated by a user to determine various topics present in video content. For instance, a first lexicon may be used for a user with a goal of having a v-log focused upon restoring classic cars, while a second lexicon may be used for a user with a goal of having a v-log focused on birdwatching. Similarly, a third lexicon may be used for a goal of maximizing repeat viewership where the audience/viewership has a preference for scenes with a particular guest. Thus, the present disclosure may function with any lexicon that is presently available or that is later developed.

In one example, the lexicon(s) may include topic models (e.g., classifiers) for a number of topics which may be applied to video content (e.g., in a format as recorded, or already segmented into video clips) to identify topics arising therein, and to tag the portions of the video content and/or video clips with the topics that are identified. For instance, topics may be identified after video clip segmentation, or may be applied to the video content overall, where topics that are identified may be further used in the segmentation into video clips.

Notably, classifiers can be trained from any text, video, image, audio and/or other types of content to recognize various topics, which may include objects like "car," scenes like "outdoor," and actions or events like "baseball." Topic identification classifiers may include support vector machine (SVM) based or non-SVM based classifiers, such as neural network based classifiers. The classifiers may be trained upon and utilize various data points to recognize topics in scenes. For instance, classifiers may use low-level invariant image data, such as colors, shapes, color moments, color histograms, edge distribution histograms, etc., may utilize speech recognition pre-processing to obtain an audio transcript and to rely upon various keywords or phrases as data points, may utilize text recognition pre-processing to identify keywords or phrases in captioned text as data points, may utilize image salience to determine whether detected objects are "primary" objects of a scene or are less important or background objects, and so forth. In one example, the processing system may tag video clips with the topic(s) that is/are determined and store the video clips, e.g., in a library of video clips 201, further indexed by time of recording.

Periodically, or upon instruction from the user 205, the processing system may automatically assemble videos from the library of video clips 201 in accordance with goals of the user 205 and audience preferences. For instance, each of the video clips 210-220 may be processed via one or more detection algorithms, classifiers, or the like, to identify the presence of the user, the presence of other individuals, and/or the presence of objects (including inanimate objects, plants, animals, etc.), topics/themes, and so on. In one example, various features of the video clips 210-220 may also be used to determine whether a respective video clip is considered "interesting." For instance, video clips with a high degree of movement, high pitched voice tone, certain words or phrases, or the like, may indicate something interesting is happening. Similarly, external sensor data may indicate an elevated heart rate or rapid eye movement of the user 205, from which the processing system may determine that the video clip(s) from the associated time period may also be "interesting." In one example, interesting video clips may be considered preferentially or exclusively for inclusion in one or more automatically generated videos.

In one example, the processing system may identify a goal of user 205 that is to maximize repeat viewership, and that an audience comprising the most repetitive viewers of videos of the user 205 have a preference for a guest 207. The audience preference may be determined from identifying an elevated volume of viewership when the videos/video clips include guest 207, as compared to other videos and/or video clips, may be determined from positive indications from one or more of the viewers, such as receiving viewer inputs giving a positive rating for one or more videos or video clips including the guest 207, and so on. In this case, the processing system may identify that the library of video clips 201 includes video clips 212 and 217 which include the guest 207. As such, the processing system may assemble these video clips into a first video 230, where the sequence of the video clips 212 and 217 in the first video 230 is indicated by the numbers in the respective lower right of each tile.

In addition, the processing system may also determine an audience preference or a user preference for a video editing technique to apply to one or more of the video clips 212 or 217 to generate the video 230. In this case, the audience may be composed of viewers from which a significant portion are also fans (viewers) of videos from another popular video creator (e.g., another v-logger). In addition, the other video creator may have videos which utilize many close-up shots of guest interviews. In this case, the processing system may also automatically apply a close-up zoom to the video clips 212 and 217 when assembling the video 230. For instance, the processing system may use a facial detection algorithm to detect the faces of user 205 and guest 207, and then crop the video frames of video clips 212 and 217 to include the close-up shots of the faces. When the video 230 is then published/made available to viewers via a publishing platform associated with the processing system, and/or one or more other publishing platforms, viewers may then obtain the video 230 that has been automatically edited so as to include close-ups of the user 205 and guest 207 in accordance with the audience preference determined by the processing system.

As another example, the processing system may identify that video clips 213-216 all relate to a theme of car repair. For instance, each of these clips may be tagged with the identified theme of "car repair" as stored in the library of video clips 201. In addition, the user 205 may have indicated a goal of having a v-log focused on car repair. In such case, the processing system may automatically assemble the video clips 213-216 into video 240. In the present example, the order of the video clips 213-316 remains the same as the order in which the video clips 213-216 were recorded, as indicated by the numbers in the lower right of each tile. For instance, the sequence of video clips 213-216 may be instructions by user 205 of how to assemble an item from three parts.

In the present example, the processing system may also identify both an audience preference and a user preference for background music for the instructional videos. For instance, the processing system may determine from historical records that the user 205 typically adds background music to the instructional videos when the user 205 is manually editing and publishing such videos. In addition, the processing system may determine that, in general, viewers of the first publishing platform like a certain style of music for instructional videos (e.g., non-obtrusive, slow-paced music suitable for use in the background, without interfering with the narration). In such case, the processing system may add publicly available and authorized background music that meets this criterion and/or may select one or more music compositions that can be obtained from an automated licensing service in a cost effective manner (e.g., below a cost threshold set by the user 205).

In still another example, the user 205 may designate a goal of having a v-log focused on "nature" and another goal of maximizing advertising revenue. In addition, the user 205 may be publishing videos to two different publishing platforms and/or for two different target audiences. The processing system may identify a preference of a first viewership/audience for panoramas and sweeping vistas. In such case, the processing system may identify that video clips 211 and 220 include nature scenes. For instance, these video clips may be tagged with the theme/topic of "nature." The processing system may therefore assemble video clips 211 and 220 into video 250. In addition, the processing system may identify that these video clips already include open vistas and meet the audience preference. However, the processing system may insert advertisement (AD) 290 between video clips 211 and 220 in accordance with both the user goal of maximizing advertising revenue and an audience preference that advertising not interrupt video clips of a same view.

The processing system may, however, identify a different preference of a viewership/audience of a second publishing platform. For example, the most dedicated viewers of videos by user 205 on the second platform may be avid birdwatchers who collectively have a preference for close-up views of birds (and who may be less interested in the overall views captured by a camera of user 205). In such case, in accordance with the user goal of maximizing advertising revenue, the processing system may assemble video 255 by inserting advertisement (AD) 295 between video clips 211 and 220, while also accommodating the audience preference by editing the video clips 211 and 220 to include bird close-ups.

In still another example, the user 205 may have a user goal of engaging viewers with any additionally interesting video content that may be generated by user 205. For instance, the user 205 may be attempting to establish larger audiences for a car repair v-log, but may supplement viewer reach by also publishing entertaining video content that may not include actual car repair instruction. For example, the user may also have a goal of maximizing repeat viewership and the processing system may determine that there is an audience preference for videos/video clips of the user engaging in exciting situations. In this case, the processing system may identify from the library of video clips 201 that video clip 219 includes exciting content. For instance, the processing system may identify excitement from audio features which are matched to excitement or intense activities by a detection algorithm and/or classifier. In one example, the identification of exciting video content may also be supplemented by wearable sensor information of the user 205 associated with the time of the video clip 219, such as an elevated heart rate or rapid eye movement. In addition, the processing system may determine that there is an audience preference for fast-paced music to accompany exciting scenes (either in connection with the particular user 205, in connection with other video creators who are identified as "similar" to the user 205, or in general). As such, the processing system may generate video 260 which includes video clip 219 edited to include such fast paced music.

It should be noted that the content segments may not be entirely uniform in length and may have lengths based upon the shot/scene detection algorithm(s) described above. However, in one example, these algorithms may be weighted to favor dividing video content into video clips that are close to uniform in length, while simultaneously maintaining the cohesiveness of the topic(s) within each video clip. In one example, the assembly of videos from video clips 201 may also account for platform requirements, such as minimum or maximum video durations, file size, frame rate, pixel volume, audio quality, and so forth. For instance, long assembly instructions or a video tutorial may have to be broken into two videos, whereas the subject matter is ideally consumed by a viewer as one unit. In one example, the user 205 may be presented with several automatically generated videos and may review and/or select one or more of the videos for publication via one or more publication platforms. For instance, the user 205 may preview videos 230, 240, 250, 255, and 260 and may select one, several, or all for publication. In one example, the user 205 may also be presented with indications of one or more editing techniques applied, and an option to confirm an agreement with the automatic editing technique(s) or to override/undo the automatic editing technique(s) applied. These and other aspects of the present disclosure are further discussed below in connection with the example method 300 of FIG. 3.

Figure 3:
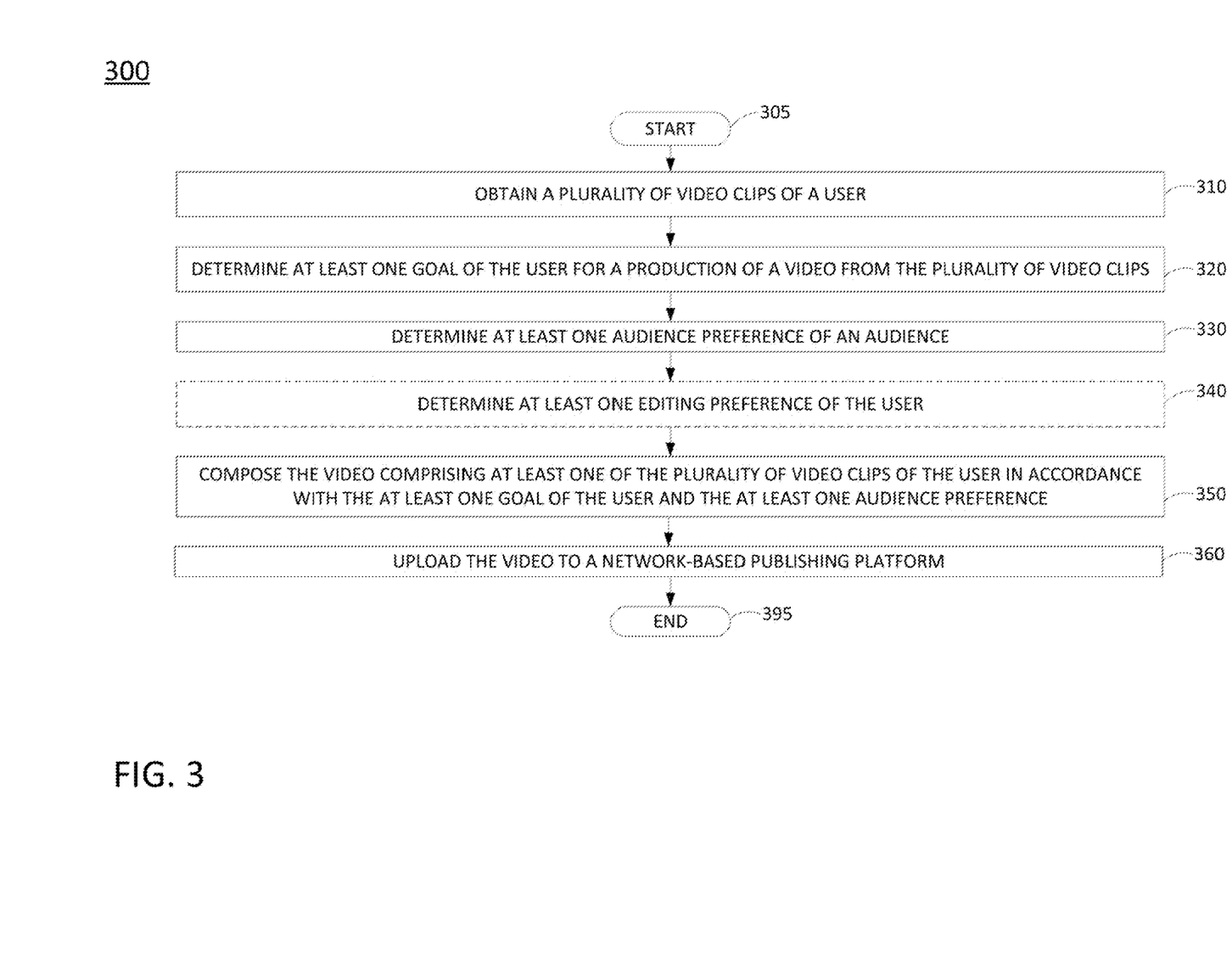
FIG. 3 illustrates a flowchart of an example method for composing a video in accordance with a user goal and an audience preference.

FIG. 3 illustrates a flowchart of an example method 300 for composing a video in accordance with a user goal and an audience preference, in accordance with the present disclosure. In one example, the method 300 is performed by a component of the system 100 of FIG. 1, such as by one of the server 116, application server 104, device 114, and/or any one or more components thereof (e.g., a processor, or processors, performing operations stored in and loaded from a memory), or by one of the server 116, application server 104, or device 114 in conjunction with one or more other devices, such as DB 106, DB 118, devices 110 or 112, and so forth. In one example, the steps, functions, or operations of method 300 may be performed by a computing device or system 400, and/or processor 402 as described in connection with FIG. 4 below. For instance, the computing device or system 400 may represent any one or more components of a server 116, application server 104, and/or device 114 in FIG. 1 that is/are configured to perform the steps, functions and/or operations of the method 300. Similarly, in one example, the steps, functions, or operations of method 300 may be performed by a processing system comprising one or more computing devices collectively configured to perform various steps, functions, and/or operations of the method 300. For instance, multiple instances of the computing device or processing system 400 may collectively function as a processing system. For illustrative purposes, the method 300 is described in greater detail below in connection with an example performed by a processing system. The method 300 begins in step 305 and proceeds to step 310.

At step 310, the processing system obtains a plurality of video clips of a user. For instance, the processing system may maintain and/or may have access to a library of video clips for the user. In one example, the processing system may also maintain and/or have access to libraries of video clips for a plurality of users (e.g., v-loggers). In one example, step 310 may include receiving video clips and/or unsegmented video content from one or more devices associated with a user. For example, the user may have a wearable computing device including a camera or coupled to a camera that is in a streaming video mode, capturing video and uploading the video to the processing system. In one example, step 310 may include pre-processing the video content to segment the video content into video clips (if not received pre-segmented into video clips). In one example, step 310 may also include pre-processing the video content and/or video clips for semantic concept detection (e.g., theme/topic detection), detection of the presence of the user, other individuals, animals, inanimate objects, and so forth. The pre-processing may be based upon low-level video and/or audio features, or higher-level video and/or audio features, such as words/phrases detected through application of automated speech recognition filters, objects detected via object detection models, and so on. In the foregoing examples, step 310 may further include tagging the video clips with metadata pertaining to the identified themes/topics, objects, individuals, words and/or phrases, and so on.

At step 320, the processing system determines at least one goal of the user for a production of a video from the plurality of video clips. For instance, the at least one goal of the user may include a maximization of revenue, a maximization of viewership, a maximization of average viewing duration, a maximization of positive commenting from an audience, a focus on at least one topic, and so on. In one example, the at least one goal of the user may be manually indicated by the user to the processing system. In one example, the at least one goal of the user may be automatically determined from historical feedback of the user regarding previous videos manually created by the user and/or automatically generated by the processing system. For instance, the user may have previously manually assembled videos from video clips relating to car repair tutorials and self-identified such videos as being for "car repair." As such, the processing system may determine that at least one goal of the user is to produce videos relating to "car repair." Similarly, the processing system may observe that the user has preferred to publish videos to a particular video publishing platform as compared to one or more other available publishing platforms. As such, the processing system may tailor the video creation in accordance with the preferences of viewers/audience on the user-preferred publishing platform, instead of viewers/audience(s) of the other publishing platforms. It should be noted that in such case, the user goal(s) may coincide with the audience preferences insofar as a user goal may be to cater to the audience preferences, whichever such preferences may be.

At step 330, the processing system determines at least one audience preference of an audience. For instance, the audience may be determined based upon at least one of a past viewership of at least one previous video of the user (e.g., the last 1000 viewers of any video of the user, the last 10,000 viewers, etc., the 1000 most repetitive viewers of videos of the user, the 10,000 most repetitive viewers, etc.), or a target viewership of the user (e.g., the most heavy viewers of video content on a particular platform, the most heavy viewers of video content relating to a particular subject as measured on a particular platform, and so on). The audience may be comprised of target viewers across platforms, target viewers on a particular platform, target viewers of a particular demographic within a particular platform, and so on.

In one example, the at least one audience preference comprises at least one video editing technique. For instance, the audience may have a preference for the application of a particular visual filter, color adjustment, or music enhancement, a preference for a user of cuts, zooms, pans, or the like, and so on. Alternatively, or in addition, the at least one audience preference may comprise a preference for a topic/theme, or a preference for a particular character. In one example, the at least one audience preference is determined from a measurement of a number of viewers of at least one past video clip. In another example, the at least one audience preference is determined from a measurement of a duration of viewing by at least one viewer of at least one past video clip. In still another example, the at least one audience preference is determined from at least one comment left by at least one viewer regarding at least one past video clip (e.g., via a video publishing platform comment feature). For example, when the at least one comment is in a textual format or is converted to a textual format, sentiment analysis may identify positive, neutral, or negative sentiment, or gradations thereof.

In one example, the processing system may have access to a library or may maintain a library/catalog of video clips having particular topics/themes, including particular characters, and/or utilizing particular editing techniques. Then the processing system may engage in NB testing over time and/or can make inferences of viewership/audience preferences from viewing and/or commenting records for past videos which may or may not have been automatically assembled. For example, the processing system may gather viewership/audience feedback for past videos of the user correlated to the presence of particular characters, themes/topics, and/or editing techniques. In one example, the processing system may also include similar measurements regarding videos of other producers (e.g., where the other producers and/or the other producers' videos may be similar by overlap of topics, overlap of viewership, by social media "following" by one or the other, by explicit indication of the user of similarity, by explicit indication of the user of a desire to have video content similar to the video content of one or more other producers, and so on.

At optional step 340, the processing system may determine at least one editing preference of the user. In one example, the at least one editing preference is obtained as an input from the user. Alternatively, or in addition, the at least one editing preference is determined from at least one of: at least one previous editing action of the user (e.g., one or more prior manual editing actions) or feedback from the user regarding at least one previous editing action of the processing system regarding at least one previous video clip of the user.

At step 350, the processing system composes the video comprising at least one of the plurality of video clips of the user in accordance with the at least one goal of the user and the at least one audience preference. For instance, step 350 may include selecting at least one video clip in accordance with the at least one goal of the user. To illustrate, the processing system may maintain and/or have access to a database of matching scores for a plurality of topics and a plurality of goals, where one or more video clips may be selected based upon themes/topics contained in metadata associated with the one or more video clips and the respective matchings scores for the respective user goals.

Similarly, the composing may include selecting at least one video clip in accordance with the at least one audience preference, e.g., where the audience preference is for a particular topic/theme or character. For instance, the processing system may apply a semantic concept detection algorithm to the at least one video clip to identify topics/themes in the at least one video clip. This may be preprocessing performed by the processing system or another system, e.g., when video clips are loaded to user's library. Thus, for example, a video clip may be selected for inclusion in the video when it matches the topic and/or includes the character. In one example, the processing system may also select a video clip for inclusion in the video when the video clip is deemed similar to one or more other video clips that were liked by the audience (based upon measurements of viewership and/or viewing duration, e.g., a long viewing duration versus a very short viewing duration), when the video clip has a similar theme/topic as other available video clips, when the video clip is visually similar to video clips that were already selected for inclusion in the video, and so on.

Step 350 may alternatively or additionally include editing the at least one video clip in accordance with at least one video editing technique comprising the at least one audience preference determined at step 330 and/or the at least one user editing preference that may be determined at optional step 340. For instance, the at least one video clip may be edited to utilize the video editing feature(s) of cut, zoom, and/or fade, adding music or a particular type of music, adding highlighting, and so forth. In one example, the at least one editing technique is selected in accordance with a database of matching scores for a plurality of editing techniques and a plurality of user goals. For instance, the database may be generated from a plurality of measurements associated with a plurality of previous video clips regarding the at least one goal, such as measuring viewership (to determine an increase and/or decrease in viewership) in response to the application of an editing technique.

At step 360, the processing system uploads the video to at least one network-based publishing platform. In one example, the at least one network-based publishing platform may be hosted by the processing system or associated with the processing system. In another example, the at least one network-based publishing platform may be selected from available network-based publishing platforms. For instance, a first publishing platform may be a website exclusively hosting user videos, where viewers may search for videos by subject, creator, date, and so forth, and/or may receive recommendations for videos based upon past videos searched for and/or viewed by the user, by the user's known contacts, or by users with a similar user profile to the user, based upon the current popularity of videos on the platform, and so on. A second publishing platform may be a social media service where users may communicate with each other, and receive and share content in a variety of different formats. For instance, users may have a content feed with messages from other users/contacts, news articles shared by contacts or selected for presentation to the user by one or more selection algorithms implemented by the service provider, and so on. In one example, user videos (e.g., v-log videos) may be also shared by users and/or selected via algorithm for inclusion in users' feeds, and may therefore be viewed by various viewers/audiences who are utilizing the social media service.

Following step 360, the method 300 proceeds to step 395 where the method ends.

It should be noted that the method 300 may be expanded to include additional steps, or may be modified to replace steps with different steps, to combine steps, to omit steps, to perform steps in a different order, and so forth. For instance, in one example the processor may repeat one or more steps of the method 300 by obtaining additional video clips, determining user goal(s) and audience preference(s), composing one or more additional videos, uploading the video(s) to one or more network-based video publishing platforms, and so on. In another example, the method 300 may be expanded to include identifying "interesting" video clips (where "interesting" is quantified as described above), and then utilizing these video clips for assembling a video (e.g., exclusively or preferentially). In still another example, the method 300 may additionally include creating different versions/different videos for different target audiences of the user. Thus, these and other modifications are all contemplated within the scope of the present disclosure.

In addition, although not expressly specified above, one or more steps of the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 4 depicts a high-level block diagram of a computing device or processing system specifically programmed to perform the functions described herein. For example, any one or more components or devices illustrated in FIG. 1 or described in connection with the method 300 may be implemented as the processing system 400. As depicted in FIG. 4, the processing system 400 comprises one or more hardware processor elements 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for composing a video in accordance with a user goal and an audience preference, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for composing a video in accordance with a user goal and an audience preference (e.g., a software program comprising computer-executable instructions) can be loaded into memory 404 and executed by hardware processor element 402 to implement the steps, functions or operations as discussed above in connection with the example method 300.

Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for composing a video in accordance with a user goal and an audience preference (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
   obtaining, by a processing system including at least one processor, a plurality of video clips of a user;
   determining, by the processing system, at least one goal of the user for a production of a video from the plurality of video clips;
   determining, by the processing system, at least one audience preference of an audience for the video, wherein the audience is distinct from the user;
   composing, by the processing system, the video comprising at least two video clips of the plurality of video clips of the user in accordance with the at least one goal of the user and the at least one audience preference, wherein the composing includes:
      determining at least one topic in at least one of the at least two video clips; and
      selecting the at least one of the at least two video clips for inclusion in the video in response to the determining of the at least one topic in the at least one of the at least two video clips; and
   uploading, by the processing system, the video to a network-based publishing platform.

2. The method of claim 1, wherein the at least one audience preference comprises at least one editing technique, wherein the composing further comprises:
   editing the at least two video clips in accordance with the at least one editing technique.

3. The method of claim 2, wherein the at least one editing technique comprises applying at least one of:
   a visual filter;
   a color adjustment;
   a music enhancement;
   a cut;
   a zoom; or
   a pan.

4. The method of claim 1, wherein the selecting the at least one of the at least two video clips is further in accordance with the at least one audience preference.

5. The method of claim 4, wherein the at least one audience preference comprises:
   a preference for the at least one topic; or
   a preference for a character.

6. The method of claim 1, wherein the at least one audience preference is determined from a measurement of a number of viewers of at least one past video clip.

7. The method of claim 1, wherein the at least one audience preference is determined from a measurement of a duration of viewing by at least one viewer of at least one past video clip.

8. The method of claim 1, wherein the at least one audience preference is determined from at least one comment left by at least one viewer regarding at least one past video clip.

9. The method of claim 1, further comprising:
   determining at least one editing preference of the user, wherein the composing the video is further in accordance with the at least one editing preference of the user.

10. The method of claim 9, wherein the at least one editing preference of the user is obtained as an input from the user.

11. The method of claim 9, wherein the at least one editing preference of the user is determined from at least one previous editing action of the user.

12. The method of claim 9, wherein the at least one editing preference of the user is determined from feedback from the user regarding at least one previous editing action performed by the processing system regarding at least one previous video clip of the user.

13. The method of claim 1, wherein the at least one goal of the user comprises:
   a maximization of revenue;
   a maximization of viewership;
   a maximization of average viewing duration;
   a maximization of positive commenting from the audience; or
   a focus on the at least one topic of a plurality of topics.

14. The method of claim 1, wherein the composing the video further comprises:
   editing the at least two video clips via at least one editing technique in accordance with the at least one goal of the user.

15. The method of claim 14, wherein the at least one editing technique is selected in accordance with an additional database of matching scores for a plurality of editing techniques and a plurality of goals.

16. The method of claim 15, wherein the additional database is generated from a plurality of measurements associated with a plurality of previous video clips regarding the at least one goal of the user.

17. The method of claim 1, wherein the audience is determined based upon a past viewership of at least one previous video of the user.

18. The method of claim 1, wherein the audience is determined based upon a target viewership of the user.

19. A non-transitory computer-readable medium storing instructions which, when executed by a processing system including at least one processor, cause the processing system to perform operations, the operations comprising:

obtaining a plurality of video clips of a user;

determining at least one goal of the user for a production of a video from the plurality of video clips;

determining at least one audience preference of an audience for the video, wherein the audience is distinct from the user;

composing the video comprising at least two video clips of the plurality of video clips of the user in accordance with the at least one goal of the user and the at least one audience preference, wherein the composing includes:

determining at least one topic in at least one of the at least two video clips; and         selecting the at least one of the at least two video clips for inclusion in the video in response to the determining of the at least one topic in the at least one of the at least two video clips; and     uploading the video to a network-based publishing platform.

20. A device comprising:

a processing system including at least one processor; and a non-transitory computer-readable medium storing instructions which, when executed by the processing system, cause the processing system to perform operations, the operations comprising:

obtaining a plurality of video clips of a user;

determining at least one goal of the user for a production of a video from the plurality of video clips;

determining at least one audience preference of an audience for the video, wherein the audience is distinct from the user;

composing the video comprising at least two video clips of the plurality of video clips of the user in accordance with the at least one goal of the user and the at least one audience preference, wherein the composing includes:

determining at least one topic in at least one of the at least two video clips; and         selecting the at least one of the at least two video clips for inclusion in the video in response to the determining of the at least one topic in the at least one of the at least two video clips; and     uploading the video to a network-based publishing platform.

\* \* \* \* \*